June 2, 1936. H. V. ATWELL 2,042,448
TREATMENT OF CRACKED HYDROCARBON DISTILLATES
Filed Nov. 24, 1934
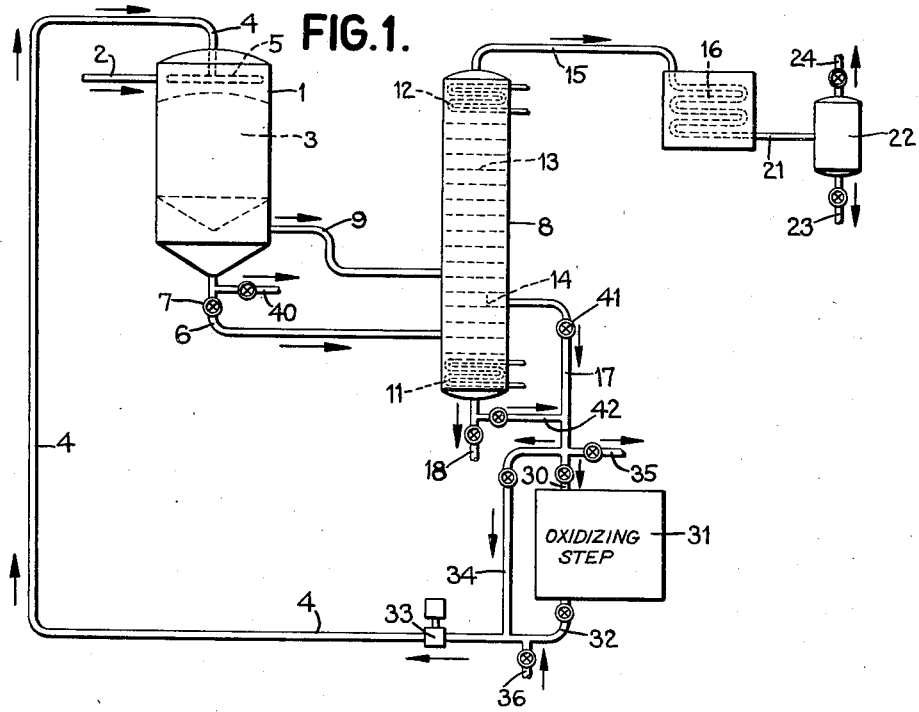
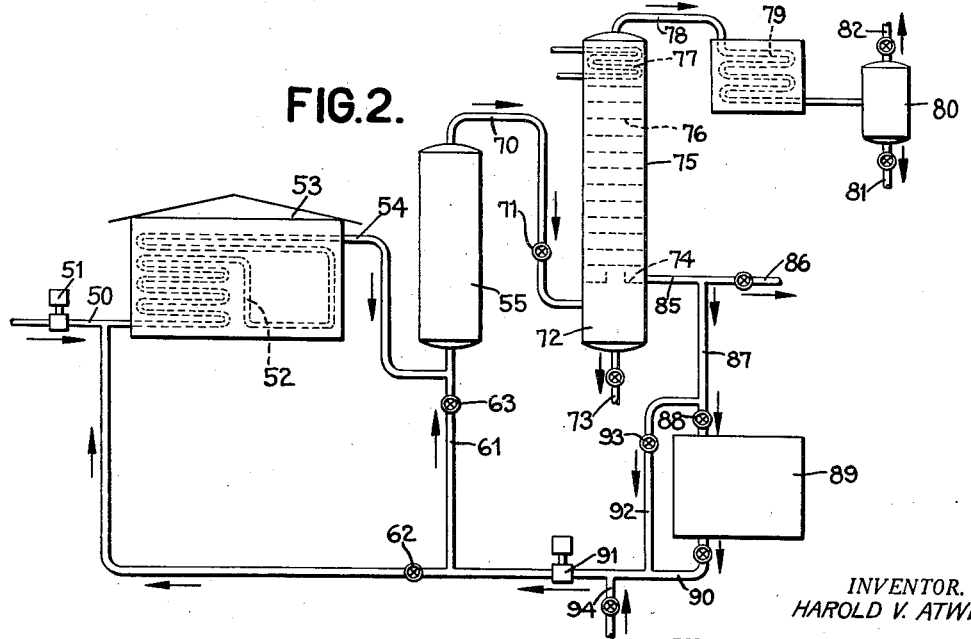
INVENTOR.
HAROLD V. ATWELL
BY Donald H Mace
ATTORNEY Patented June 2, 1936

2,042,448

UNITED STATES PATENT OFFICE 2,042,448

TREATMENT OF CRACKED HYDROCARBON DISTILLATES

Harold V. Atwell, White Plains, N. Y., assignor to The Gray Processes Corporation, Newark, N. J., a corporation of Delaware Application November 24, 1934, Serial No. 754,596

6 Claims. (Cl. 196—96)

My invention relates to the treatment of cracked hydrocarbon distillates, such as gasoline or naphtha, for the removal of objectionable gum-forming constituents therefrom, and more particularly to processes for treating cracked distillates in which the distillate is subjected either in the liquid phase or in vapor phase to contact with a solid adsorbent catalytic material at elevated temperature, or to the influence of elevated temperature and pressure alone, to effect the polymerization of gum-forming constituents to products boiling above a gasoline boiling-point range, which may readily be removed from the desired purified products.

An object of my invention is to provide a process of the character indicated for removing gum-forming constituents from cracked naphtha and gasoline in which polymerization of undesirable gum-forming constituents is accelerated and purification of the distillate is enhanced.

My invention has for further objects such additional operative advantages and improvements as may hereinafter be found to obtain.

In processes of the character indicated hereinabove, it has been proposed to recirculate polymers formed during the course of the treatment and subsequently separated from the product to the treating phase. While such recirculated polymers may exert some influence upon the degree or rate of polymerization taking place, my invention contemplates increasing the beneficial effect of the recirculated polymers by subjecting them to an oxidizing treatment before recirculation. The oxygenated organic compounds formed upon such oxidation exert a more strongly accelerative effect upon the polymerization reaction than is true of the unoxidized polymers and for that reason materially aid the purification.

Broadly speaking, my invention contemplates the introduction into the polymerizing zone of oxidized or oxygenated hydrocarbon derivatives from any source, but in a preferred embodiment, as indicated hereinabove, the oxidized or oxygenated compounds thus introduced comprise products obtained by oxidizing or oxygenating polymers produced during the course of the process, and preferably recirculated.

Where such recirculation of oxidized polymers is carried out according to my invention, my process further contemplates fractionation of the treated vapors to separate therefrom any polymers which may be entrained or carried along with the vapors leaving the treating zone, and also fractionation of the resultant polymers to separate therefrom undesirably heavy residue, comprising heavy products of polymerization and oxidation which would otherwise tend to accumulate in the system. The fractionation of the treated vapors and the resultant polymers may, if desired, be carried out in a single stage or alternatively may be carried out in separate stages.

In order that my invention may be more clearly set forth and understood, I now describe, with reference to the accompanying drawing illustrating and forming a part of this specification, various preferred forms and manners in which my invention may be practiced and embodied. In the drawing:

Fig. 1 is a more or less diagrammatic elevational view of apparatus for clay-treating cracked hydrocarbon vapors, illustrating the application of my process to an operation of this character, and Fig. 2 is a similar view of apparatus for effecting the purification of cracked hydrocarbon distillates in the liquid phase under the influence of elevated temperature and pressure, and also illustrating the application of my invention to a process of this character.

Referring now to the drawing, and more particularly Fig. 1 thereof, cracked hydrocarbon vapors which have previously been fractionated to remove constituents heavier than gasoline, and which may come either from the main fractionating tower of a cracking unit, or from a redistillation unit, enter a treating tower 1 through a line 2 and pass downwardly through a bed 3 of catalytic adsorbent material such as fuller's earth or other solid contact material commonly used in the purification of cracked hydrocarbon distillates from gum-forming impurities. During the downward passage of the vapors through the bed of contact material, by reason of the catalytic effect of the latter, gum-forming constituents of the vapors are polymerized, forming liquid polymerized products boiling above the boiling range of gasoline and hence susceptible of being removed from the final product without difficulty.

Contact between the vapors and catalytic material takes place under the usual conditions of elevated temperature and also if desired under an elevated pressure of for example from 50 to 200 pounds per square inch. The temperature may be so maintained that substantially no condensation of the vapors themselves takes place while permitting polymers formed during the treatment to condense, but is preferably so regulated that a portion of the vapors being treated also condenses to form a solvent for the polymers, thereby assisting in the removal of the polymers from the treating material as the process continues.

According to my invention, as the vapors pass through the bed of contact material, the bed is simultaneously subjected to a flow of oxidized liquid hydrocarbons, preferably oxidized polymers produced during the treatment. Such oxidized hydrocarbons are conveniently introduced into the upper portion of the treating tower 1 through a line 4 which may be provided as shown with a suitable distributing or spraying device 5.

The bulk of the polymers formed during the treatment, as well as oxidized polymers or other oxidized hydrocarbon derivatives introduced to the treating tower 1 in liquid form, pass downward through the bed of contact material and may be withdrawn from the bottom of the tower 1 through a line 6 having a valve 7 and leading to the lower portion of a fractionator 8. The treated vapors, containing some polymers, are removed from the lower portion of the treating tower 1 through a vapor line 9 and pass to the fractionator 8, entering the latter at a point preferably located above the point of introduction of the liquid polymers passing to the fractionator 8 through the line 6.

In the preferred instance illustrated in Fig. 1, the after-fractionator 8 is of more or less conventional design, being provided with heating means such as a heating coil 11 located at or near the bottom thereof, cooling means such as a cooling coil 12 located in the upper portion thereof, suitable plates or trays 13 distributed throughout the length thereof and a trap-out tray or weir 14 which is preferably located at a point intermediate between the points of entry of the lines 6 and 9. As the vapors entering the fractionator 8 pass upward through the latter they are subjected to fractionation and partial condensation, and the liquid polymers entering the fractionator 8 through the line 6 are also subjected to fractionation, with the result that the treated gasoline and lighter materials remain in vapor form, passing overhead through a line 15 to a condenser 16, while polymers, together, if desired, with some lighter hydrocarbon distillate to serve as a solvent therefor, are withdrawn from the weir 14 in liquid form through a line 17. Very heavy resin-like bodies or oxidized polymers of boiling points too high to be recirculated in the process are withdrawn from the bottom of the after-fractionator 8 through a valved line 18.

It will be understood, however, that while the above represents a preferred manner of fractionating the polymers, other types of fractionation may be employed. Thus, for example, if it is found that the heaviest products of polymerization, which it is not desired to recirculate, are collected largely in the materials removed from the bottom of the line 6, these polymers may be delivered to a separate flashing or distilling zone (not shown) and vapors liberated in this zone may be introduced into the after-fractionator 8. In this instance, the weir 14 may be dispensed with and the polymers for recirculation may be withdrawn from the bottom of the after-fractionator 8.

Condensate from the condenser 16, together with uncondensed gas, passes through a line 21 to a conventional gas separator 22 from which the treated distillate is withdrawn through a valved line 23 while uncondensed gases escape through a valved line 24.

In the preferred instance, the polymers withdrawn from the weir 14, or if desired from the bottom of the after-fractionator 8 where a previous flashing or distilling operation has been employed to separate the undesired heavy polymers, are delivered in part through a valved line 30 to an oxidizing step 31. Here the polymers are subjected to a suitable oxidizing treatment with which to effect a controlled oxidation or oxygenation thereof. For this purpose I may employ any suitable oxidizing medium of which there are many but of which such agents as free oxygen, potassium permanganate and potassium chlorate may be specifically mentioned as suitable. The oxidation of the polymers is preferably carried out to an extent sufficient to cause oxidation or oxygenation to a substantial extent but short of that point which would render the polymers too high-boiling or too viscous in character to be handled easily. However, my invention does not exclude oxidation even to the latter extent. The oxidized polymers from the step 31 then pass through a valved line 32 to a pump 33 which returns them through the line 4 and the spraying device 5 to the upper portion of the treating tower 1.

If desired, especially where the oxidation of the polymers in the step 31 has been carried out to a more or less marked extent, the treated polymers from the oxidizing step 31 may be combined with a further portion of the polymers withdrawn from the fractionator 8 but which has not been subjected to oxidation, this portion being by-passed around the oxidizing step 31 through a valved line 34 and being blended with the oxidized polymers from the oxidizing step 31 before being returned to the treating tower 1. Polymers not recirculated may be removed through a valved line 35 for disposition as desired.

Oxidized or oxygenated hydrocarbon derivatives from any outside source and of any suitable character may also be introduced into the tower 1, either alone or commingled with the oxidized or oxygenated polymers withdrawn from the oxidizing step 31. For this purpose I have provided a valved inlet line 36 communicating with the line 32 on the inlet side of the pump 33.

If desired, the valve 7 may be closed and all of the polymers withdrawn from the bottom of the treating tower 1 may be withdrawn from the system through a valved line 40. In this instance, the use of the weir 14 may be discontinued by closing a valve 41 provided for this purpose in the line 17, and the polymers removed from the vapors in the fractionator 8 may be delivered by means of a valved line 42 to the line 17 and thence to the oxidizing step 31.

In the instance shown in Fig. 1, I have shown the application of my invention to a process for treating hydrocarbon distillate in the vapor phase and involving the use of solid contact material such as fuller's earth. However, as has been indicated hereinabove, my invention may also be employed in conjunction with or as an adjunct to other types of treating processes. Thus, for example, in Fig. 2 I have illustrated the application of my invention to a process for removing gum-forming constituents from cracked hydrocarbon distillates under the influence of heat and pressure, preferably in the liquid phase, and either with or without contact at such elevated temperature and pressure with solid adsorbent catalytic contact material, such as fuller's earth.

Referring now to Fig. 2, cracked hydrocarbon distillate such as naphtha or gasoline is introduced from a suitable source (not shown) through a line 50 wherein is located a pump 51 and is passed through a heating coil 52 located in a suitable heating furnace 53. In the preferred instance, the gasoline or naphtha is heated while passing through the coil 52 to a temperature above the normal vaporizing temperature of the oil but below a cracking temperature, while under a high pressure preferably sufficient to maintain the oil substantially in the liquid phase. Thus, I may employ temperatures of from 500° to 700° F. and pressures of from about 200 pounds per square inch to about 1000 pounds per square inch or more, but preferably in excess of 500 pounds per square inch. The heated oil leaving the coil 52 passes through a line 54 to a soaking drum 55 where the oil is maintained for a sufficient time to insure polymerization of the undesired gum-forming constituents. The soaking drum 55 may be interiorly provided with a bed of solid adsorbent catalytic material such as fuller's earth or the like, or, if desired, may be empty of such contact material. Where such contact material is employed, it serves to decolorize the products undergoing treatment and may also assist to a considerable extent in the polymerization of gum-forming constituents.

In accordance with my invention, oxidized hydrocarbon derivatives are introduced to the oil undergoing treatment, either before passage through the coil 52 by means of a line 60 communicating with the line 50, or after passage through the coil 52 by means of a line 61 communicating with the line 54. Valves 62 and 63 are provided with the lines 60 and 61.

The treated products, including polymers formed during the treatment as well as oxygenated or oxidized hydrocarbon derivatives introduced in the manner set forth, pass from the soaking chamber 55 through a line 70 having a pressure-reducing valve 71 and are introduced into an evaporator or flashing chamber 72. If desired, products passing from the soaking drum 55 to the evaporator 72 may be additionally heated to assist in the vaporization of the lighter portion thereof in the evaporator 72. Heavy polymers which it is not desired to recirculate are withdrawn from the bottom of the evaporator 72 through a valved line 73, while the liberated vapors pass upward through a trap-out tray 74 into a fractionator 75 provided with plates or trays 76 and cooling means such as a cooling coil 77.

Passing upward through the fractionator 75, the treated vapors are fractionated and subjected to partial condensation for the removal of polymers therefrom. The remaining vapors, including vapors of the desired treated distillate, then pass through a line 78, condenser 79 and a gas-separator 80, the treated distillate being withdrawn through a valved line 81 while uncondensed gases leave the separator 80 through a valved line 82.

Polymers condensed and separated during the passage of the vapors through the fractionator 75 are withdrawn from the trap-out tray 74 through a line 85 and may pass through a valved line 86 out of the system. Preferably, however, a portion of these polymers are delivered through a line 87 having a valve 88 to an oxidizing step 89 where they are oxidized in the manner indicated hereinabove with reference to the oxidizing step 31 of Fig. 1.

The oxidized polymers from the oxidizing step 89 are then delivered through a valved line 90 to a pump 91 which in turn delivers them either through the line 60 to the line 50 or through the line 61 to the line 54 and the soaking chamber 55.

As in the previous instance, the oxidized polymers may be commingled with unoxidized polymers by-passed around the treating step 89 through a by-pass line 92 having a valve 93. Moreover, oxidized or oxygenated hydrocarbon derivatives may be introduced by means of a valved line 94 for delivery to the coil 52 or to the soaking chamber 55 either alone or in admixture with oxidized polymers from the oxidizing step 89.

My invention is also applicable to a process in which light hydrocarbon distillate is subjected, under the influence of elevated temperature and pressure, in the vapor phase but in the absence of a solid contact catalyst, for the polymerization of gum-forming constituents. When this is the case, the oxidized polymers or other oxidized or oxygenated hydrocarbon derivatives may be suitably introduced into the treating zone and the latter is preferably provided with suitable distributing or contacting devices for insuring contact between the vapors undergoing treatment and the oxidized or oxygenated products thus introduced thereto.

According to the process of my invention, the introduction of oxygenated or oxidized hydrocarbon derivatives, especially oxidized polymers produced during the course of treatment, results in a material acceleration of the polymerization reaction taking place in the treating zone, which in turn results in an enhanced purification of the cracked distillate undergoing treatment as well as other advantages, as will readily be appreciated by those skilled in the art.

It will further be appreciated by those skilled in the art that while I have described my invention hereinabove with reference to various specific illustrative examples, my invention is not limited to the details of such illustrative examples but may variously be practiced and embodied within the scope of the claims hereinafter made.

I claim:
1. In a process for purifying light cracked hydrocarbon distillate by effecting polymerization of gum-forming constituents to products of higher boiling points, the improvement which comprises promoting such polymerization by introducing to the distillate undergoing polymerization treatment polymers formed during the same or a similar treatment, said polymers having been first subjected to the action of an oxidizing agent.

2. In a process for purifying light cracked hydrocarbon distillate by effecting polymerization of gum-forming constituents to products of higher boiling points, the improvement which comprises separating resultant polymerized products from the desired treated distillate, subjecting at least a portion of said products to partial oxidation, and returning the partially oxidized products to the polymerizing stage.

3. In a process for purifying light cracked hydrocarbon distillate by effecting polymerization of gum-forming constituents to products of higher boiling points, the improvement which comprises effecting such polymerization in the presence of partially oxidized polymerization products from previous polymerization, separating a heavy polymer fraction and a lighter polymer fraction from the treated distillate, subjecting at least a portion of the lighter polymer fraction to partial oxidation, and returning the thereby partially oxidized polymers to the polymerizing stage.

4. The process of purifying light cracked hydrocarbon distillate which comprises passing said distillate through a body of solid adsorbent catalytic material at an elevated temperature and while essentially in the vapor phase to effect a polymerization of gum-forming constituents to products of higher boiling points, removing polymerized products from the desired treated distillate, subjecting them to partial oxidation and returning the oxidized products to said body of solid adsorbent catalytic material.

5. The process of purifying light cracked hydrocarbon distillate which comprises subjecting such distillate to a temperature in excess of its normal vaporizing temperature but below a cracking temperature while under a pressure in excess of 200 pounds per square inch for a sufficient time to effect a polymerization of gum-forming constituents to products of higher boiling point, separating polymerized products from the desired treated distillate, partially oxidizing a portion of said products and returning thereby oxidized products to the polymerizing stage.

6. The process of purifying low-boiling cracked hydrocarbon vapors which comprises passing such vapors through a bed of adsorbent catalytic material while essentially in the vapor phase to effect a polymerization of unstable gum-forming constituents lying within the gasoline boiling-point range to higher-boiling polymers, fractionating the treated vapors to separate a heavy fraction containing such polymers, condensing the fractionated vapors to recover the desired treated gasoline distillate, subjecting at least a portion of said polymer fraction to an oxidizing treatment to form oxygenated polymer derivatives, and returning the product of said oxidizing treatment to the bed of adsorbent catalytic material to promote polymerization and assist in removing further polymers.

HAROLD V. ATWELL.